Aug. 2, 1949.        H. R. SUMMERHAYES, JR., ET AL        2,478,023
FREQUENCY MONITORING SYSTEM
Filed March 22, 1946
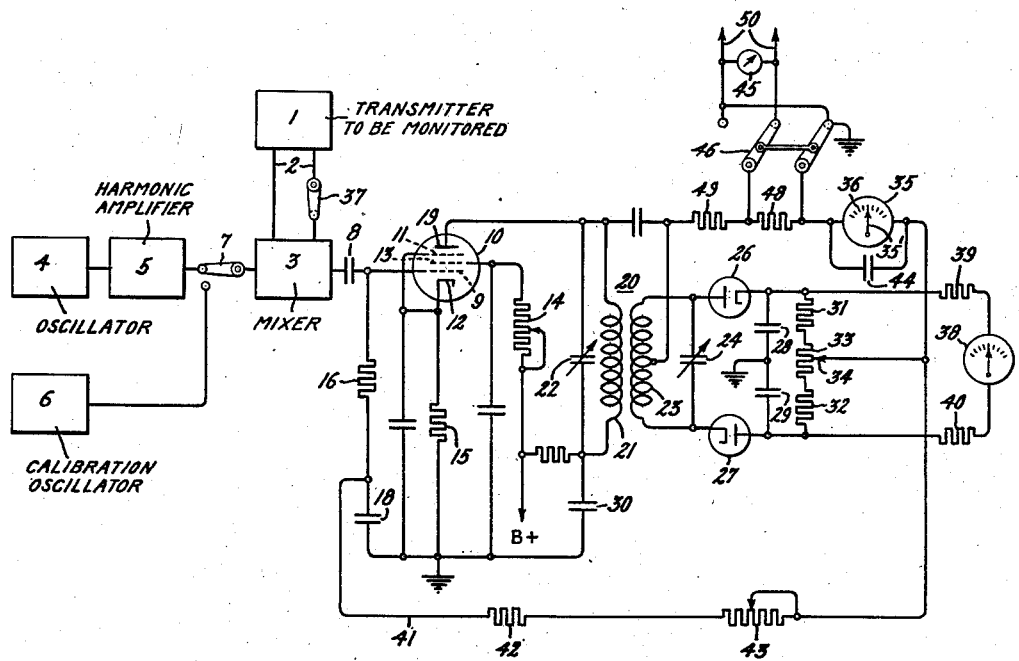
Inventors:
Harry R. Summerhayes, Jr.
Paul W. Howells,
by Morton D. Moore
Their Attorney.

Patented Aug. 2, 1949

2,478,023

UNITED STATES PATENT OFFICE 2,478,023

FREQUENCY MONITORING SYSTEM

Harry R. Summerhayes, Jr., and Paul W. Howells, Schenectady, N. Y., assignors to General Electric Company, a corporation of New York Application March 22, 1946, Serial No. 656,224

5 Claims. (Cl. 172—245)

1

This invention relates to systems for monitoring frequency, such as the frequency of a broadcast station, and relates particularly to the monitoring of frequency modulation broadcast systems. It is a primary object of our invention to provide a new and improved monitoring system which is not responsive to changes in the intensity of a signal being received.

It is a further object of our invention to provide a new and improved monitor for indicating the center frequency of a frequency modulated wave and which is compensated for changes in center frequency indication due to changes in intensity of a received wave.

In the United States Letters Patent No. 2,309,481 granted to Harry R. Summerhayes, Jr. on January 26, 1943, there is disclosed a frequency monitoring system which employs a frequency discriminator and a preceding amplifier to indicate the center frequency of the frequency modulated wave being monitored. The amplifier is operated as a class A amplifier to avoid the spurious center frequency changes encountered when limiting of an applied wave is employed. Since the discriminator employed in such a monitor is sensitive to amplitude variations, as well as frequency variations, it is desirable to limit the intensity of a wave which is applied to the frequency discriminator to prevent variations in the amplitude modulation which, in turn, produce additional current in the output of the discriminator circuits. Limiting, however, introduces distortion of an applied wave which, in turn, may produce a change in the center frequency indication as the intensity of the wave applied to the limiter circuit is varied. Such change is due to the response of the discriminator circuits to harmonic frequencies of the wave applied to the circuit, which harmonics are introduced due to the limiting action. Accordingly, it is a further object of our invention to provide a new and improved monitoring system which employs a frequency discriminator and a limiter and in which the effect of harmonic distortion is substantially completely eliminated.

The novel features which we believe to be characteristic of our invention are set forth with particularity in the appended claims. The invention itself, however, both as to its organization and method of operation, together with further objects and advantages thereof, may best be understood by reference to the following description taken in connection with the accompanying drawing in which the single figure represents an embodiment of our invention.

2

Referring to the drawing, we have indicated at 1 a transmitter, the frequency of which is to be monitored and which may be, for example, a frequency modulation transmitter such as is ordinarily employed in broadcasting and similar radio signal systems. A portion of the transmitter signal, of the frequency at which the transmitter operates, is supplied by means of conductors 2 to a mixer circuit 3 included in the frequency monitor of our invention. This monitor comprises, in addition to the mixer 3, a suitable oscillator 4 of stable frequency and which may be for example a crystal controlled oscillator, and a harmonic amplifier 5 through which oscillations are supplied to the mixer 3. For calibration purposes, an additional crystal oscillator 6 is provided and may be connected to the mixer 3 through a switch 7.

In the use of the circuit for monitoring the frequency of the transmitter 1, the switch 7 connects the oscillator 4 and the harmonic amplifier 5 to the mixer 3 so that oscillations from the amplifier 5, as well as from the transmitter 1, are supplied to the mixer 3 where they are beat together to produce oscillations having a frequency equal to the difference in frequencies of the two oscillations applied to the mixer. Oscillations of this difference frequency are supplied through a coupling condenser 8 to the control electrode 9 in the input circuit of a limiter amplifier 10. The limiter amplifier 10 is illustrated as of the pentode type having a suppressor grid 11 which is directly connected to the cathode 12, and a screen electrode 13 which is connected through an adjustable resistance 14 to a source of unidirectional potential indicated conventionally by the legend B+. The cathode 12 is connected to ground through a cathode resistance 15. The control electrode 9 likewise is connected to ground through grid biasing resistor 16, and a circuit to be described later. A capacitor 18 is connected between the grid bias resistor 16 and ground.

The anode 19 in the output circuit of the limiter 10 supplies oscillations of the difference frequency and of a limited intensity to the input circuit of a balanced frequency discriminator 20 comprising transformer 20 having a primary winding 21 tuned by means of a condenser 22 to the difference frequency and having a secondary winding 23 tuned by means of condenser 24 to this same frequency. The high voltage terminal of the primary winding of transformer 20 is connected through a condenser 25 to the mid point of the secondary winding 23. The opposite terminals of the secondary winding are connected through rectifiers 26, 27 and condensers 28, 29 to ground and thence through condenser 30 to the opposite terminal of the primary winding. Since the primary winding and secondary winding of the transformer are tuned to the frequency of oscillations supplied thereto, the voltages across the two rectifiers are equal when the frequency is of the proper value. This is because the secondary voltage is in quadrature phase relation with the primary voltage. This phase relationship exists only when the frequency of applied oscillations is that to which the windings are tuned. Upon any shift in this frequency, the phase of the secondary voltage shifts in a corresponding direction. The two voltages applied to one rectifier become more nearly in aiding phase and the two voltages applied to the other rectifier become in more nearly opposed phase relation. Thus, if the frequency increases, the absolute value of voltage with respect to ground on one rectifier increases while that on the other decreases, whereas, if the frequency decreases, the voltage on the one rectifier decreases and that on the other increases.

The cathode of the diode 26 is connected to the anode of the diode 27 through a pair of equal resistances 31, 32 which, in turn, are connected together through a resistance 33 having a variable tap 34 which is connected to ground through a center reading meter 35. The diodes 26, 27 are poled to pass current through meter 35 in opposite directions and, accordingly, when the frequency is of the correct value, no current exists in the meter and its index 35' assumes a central position on the scale 36. If the frequency increases, the index 35' deflects to the right, whereas if the frequency decreases, it deflects to the left in accordance with the intensity and polarity of the winding of the instrument. Thus, the frequency of the oscillations to be monitored may be directly read upon this current responsive instrument 35. By adjustment of the position of tap 34 on resistance 33, the meter may be adjusted to a central position of the scale 36 or a zero reading when the frequency supplied to the discriminator circuits is of the desired value of the difference frequency. Such a desired intermediate frequency may be provided by connecting switch 7 to the calibration crystal oscillator 6 and disconnecting the transmitter 1 from the mixer 3 by means of the switch 37.

Means are provided for measuring the intensity of oscillations supplied to the transformer 20 and comprise a voltmeter 38 which is connected through resistances 39, 40 to the opposite terminals of the load resistances 31, 32. Thus, the meter 38 produces an indication in accordance with the sum of the voltages across these two resistances, since these voltages are applied to the meter 38 in aiding polarity.

Since the discriminator circuit described is sensitive to amplitude variations, as well as to frequency variations, the limiter 10 functions in the usual manner of a grid rectifying circuit to provide a wave of substantially constant intensity to the discriminator circuit. It has been observed that such limiting in itself is accompanied by the introduction of harmonic frequency components in the anode current which is supplied to the discriminator circuit. Furthermore, it has been found that such harmonic frequency currents produce a spurious change in the indication of center frequency on meter 35 if the intensity of the signals supplied to control grid 9 of the limiter amplifier is varied. Thus, as the voltages supplied to the control grid 9 increase in value, the output currents of the limiter amplifier contain a greater percentage of harmonic frequencies. The discriminator circuit is such, moreover, that it responds to second and even third harmonics of the frequency to which its circuits are tuned. This response of the discriminator circuits is sufficient to give observable changes in the center frequency indication of the meter 35 when used for very sensitive frequency measurements. Accordingly, means are provided to compensate for such spurious and undesirable changes in center frequency indication and comprise a conductor 41 which is connected to the lower terminal of resistance 16 and which completes the D. C. path of the control grid circuit of limiter 10 by connection through a fixed resistance 42 and an adjustable resistance 43 to the input terminal of meter 35. By this connection, the grid bias current of the amplifier limiter 10 which varies in amount substantially proportionally to the variation of the intensity of the input signal applied to control grid 9 is utilized to supply a unidirectional current to the meter 35 which is of a polarity to oppose the component of output current of the discriminator circuit caused by the introduction of harmonic frequencies in the currents supplied to the discriminator circuits. The intensity of this grid bias current is adjusted by means of the resistance 43 so that the two currents flowing through the frequency indication meter 35, one of which is due to the harmonic response of the discriminator circuit and the other of which is derived from the grid bias circuit, cancel each other substantially completely as the input voltage supplied to the control electrode 9 is varied over a range of approximately 25 per cent.

As described in the above-referred to patent of Harry R. Summerhayes, Jr., the meter 35 is by-passed by means of capacitor 44 for voice or music currents so that it responds only to the average center frequency of the applied difference frequency voltage.

In order that the magnitude of opposite peaks of modulation of the frequency modulated transmitter may be measured, a voltage responsive indicating instrument 45 is connected through double-pole, double-throw switches 46, 47 across a small resistance 48 connected in series through a radio frequency choke 49 between the mid point of the secondary winding 23 and ground. Thus, the instrument 45 indicates the peak value of the voltage produced on resistance 48 during the peaks of modulation of the transmittted wave. Audio frequency currents may, if desired, be obtained from conductors 50 likewise connected across output resistance 48 through switches 46, 47.

An important advantage of our improved frequency monitoring system is that variations in the difference frequency signal level due to variations in the input signal level are greatly reduced so that the discriminator output remains substantially constant with changes in signal level. Furthermore, compensation for any changes in center frequency indication by the introduction of harmonic frequencies into the discriminator circuits is provided so that no spurious change in center frequency indication due to harmonics is observed.

While we have shown particular embodiments of our invention, it will of course be understood that we do not wish to be limited thereto since different modifications may be made, both in the circuit arrangement and in the instrumentality employed, and we contemplate by the appended claims to cover any such modifications as fall within the true spirit and scope of our invention.

What we claim as new and desire to secure by Letters Patent of the United States is:

1. The combination in a device for monitoring the frequency of a high frequency wave, of means for limiting the amplitude of said wave, said limiting means having an input circuit and an output circuit, a balanced frequency discriminator connected to the output circuit of said limiting means, means for measuring the intensity of currents in said discriminator to indicate variations from a desired value of frequency of said wave, and means for compensating changes in the currents in said discriminator caused by distortion of said wave by said limiting means comprising a unidirectional current connection between said input circuit and said measuring means.

2. The combination in a device for monitoring the frequency of a high frequency wave of means for limiting the amplitude of said wave, a balanced frequency discriminator connected to said limiting means, means for measuring the intensity of currents in said discriminator to indicate variations from a desired value of frequency of said wave, means for compensating changes in the currents in said discriminator caused by distortion of said wave by said limiting means comprising means for rectifying said wave prior to the limiting thereof, and means supplying said rectified wave to said current measuring means.

3. The combination, in a frequency monitor circuit, of means for limiting the intensity of a wave to be monitored, means for rectifying said limited wave and for producing a current varying with the average frequency of said wave, means for measuring said current to indicate said average frequency, said wave being subjected to harmonic distortion by said limiting means to a degree varying with the intensity of said wave, means preceding said limiting means in said circuit for rectifying said wave to produce a current varying with the intensity of said wave, and means supplying said last current to said measuring means to compensate for errors in said frequency indication caused by said distortion.

4. The combination, in a frequency monitor circuit, of means for limiting the intensity of a wave to be monitored, means for rectifying said limited wave and for producing a current varying with the average frequency of said wave, means for measuring said current to indicate said average frequency, said wave being subjected to harmonic distortion by said limiting means to a degree varying with the intensity of said wave, means preceding said limiting means in said circuit for rectifying said wave to produce a current varying with the intensity of said wave, and means supplying said last current to said measuring means in a polarity opposite to the polarity of the frequency varying current supplied thereto to compensate for errors in said frequency indication caused by said distortion.

5. The combination, in a frequency monitor circuit, of means for limiting the intensity of a wave to be monitored, said limiting means including means for producing a current varying with the intensity of said wave, means for rectifying said limited wave for producing a second current varying with the average frequency of said wave, current measuring means, and means supplying said first and second currents to said current measuring means in opposition, whereby the indication of average frequency provided by said measuring means is compensated for distortion of said wave produced by said limiting means.

HARRY R. SUMMERHAYES, Jr.
PAUL W. HOWELLS.

REFERENCES CITED

The following references are of record in the file of this patent:

UNITED STATES PATENTS

| Number | Name | Date |
| --- | --- | --- |
| 2,309,481 | Summerhayes, Jr. | Jan. 26, 1943 |